3,152,042
STYRYLQUINOLINIUM COMPOSITIONS USED
AS ANTHELMINTICS
Irwin B. Wood, Hopewell, John A. Pankavich, Hamilton Square, and Ronald E. Bambury, Trenton, N.J., assignors to American Cyanamid Company, New York, N.Y., a corporation of Maine
No Drawing. Filed Jan. 26, 1962, Ser. No. 169,083
8 Claims. (Cl. 167—53)

This invention relates to new compositions of matter and methods of administration. More particularly, it relates to substituted styrylquinolinium compounds and a carrier, useful in the control and treatment of helminthiases in warm blooded animals.

The losses due to helminth infections in livestock total millions of dollars annually. Therefore, an effective anthelmintic composition at a comparatively low cost is highly desirable in the practice of animal husbandry.

The new compositions of the present invention have as the active ingredient styrylquinolinium compounds of the formula:

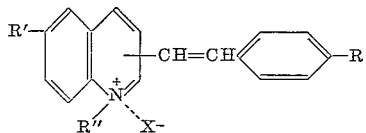

in which R is selected from the group consisting of hydrogen, halogen and lower dialkylamino groups, R' is selected from the group consisting of hydrogen and methyl radicals, R'' is lower alkyl and X is an anion. The styryl side chain is attached to the substituted quinoline in the 2 or 4 position. The anions may be for example, chloride, iodide, bromide, $ROSO_3$ wherein R is alkyl, etc.

We have found that our new compositions of matter are highly efficacious and possess advantages over currently used anthelmintics. For example, the new compositions of this invention are effective against the migrating larval stages of the swine roundworm, Ascaris suum, and thus prevent extensive liver damage and verminous pneumonia and loss of weight in swine. On the other hand, the anthelmintics in commercial use are ineffective against the larval stage of ascarids which cause more morbidity and mortality than the adult stages in swine, particularly in young pigs.

The new compositions of this invention are highly effective against larval as well as the adult stages of hookworm and against ascarids in dogs whereas the majority of current therapeutic agents are effective against adult worms only.

A great deal of the mortality, morbidity and other pathology from hookworm infections is caused by severe anemia resulting from the bloodsucking of the immature hookworms in the prepatent stages of infections. The currently used anthelmintics do not prevent mortality resulting from the severe infections of young worms because those treatments are effective only against the adults. The effective doses of the compounds in this invention eliminate the larvae before they are sucking blood. When the active ingredients of this invention are given in low level repeated daily doses in feed, they serve as a prophylactic control against helminths such as ascarids, hookworm and other helminths in warm blooded animals.

The new compositions are highly active when administered in various ways such as in feed stuffs, capsules, by drench and various pharmaceutical forms hereinafter described.

Anthelmintic compositions of this invention have been found to be effective against the gastrointestinal helminths of sheep. An oral drench containing 2.57 grams of 1-methyl-2-(p-dimethylaminostyryl)-quinolinium iodide (equivalent to 100 mg./kg. of body weight) was 100% effective in eliminating whipworms, Trichuris ovis, from a naturally infected sheep.

The active component of the new compositions can be present in amounts from 10 mg. to 40 g., however, the preferred range is from about 20 mg. to 30 g., in an edible carrier depending upon the animal to be treated and the mode of administration. When the edible carrier is animal feed, the active ingredient should not exceed 0.2% of the total daily ration. The compositions also contain various pharmaceutical carriers which may be, for example, non-toxic liquid solvents, gums, cellulose gums, processed proteins such as soy and peanut, various cereals such as wheat germ, rice flour, potato flour, corn and feed stuff per se.

We have found that long term continuous administration in the feed of livestock or farm animals is often desirable for keeping worm infection under control and to act as a prophylactic measure in keeping animals in good condition.

The preparation of most of these compounds are described in the chemical literature, for example, J. Am. Chem. Soc. 77, 1687 (1955), and hereinafter in the examples.

The following examples illustrate representative methods by which the active components of the present compositions can be prepared.

EXAMPLE 1

Preparation of 1-Methyl-2-(p-Dimethylaminostyryl)-Quinolinium Chloride 1-methylquinaldinium chloride (77.5 g.), p-dimethylaminobenzaldehyde (59.7 g.), 350 ml. of ethyl alcohol and 1 ml. of piperidine as catalyst are refluxed for 15 hours. At the end of this time the solution is allowed to cool somewhat and 175 ml. of ethyl acetate is added to reduce the solubility of the product. After the solution cools to room temperature, the first crop of crystalline product (23.6 g.) is filtered off and the second crop of crystals (35.8 g.) recovered by reducing the volume of the mother liquor. A third crop (22.8 g.) is recovered from the mother liquor residue. The three crops of crystals are combined and crystallized three times, first from ethanol and ethyl acetate, then from chloroform and ethyl acetate and finally from methanol and dioxane, yielding a product analytically pure.

EXAMPLE 2

Preparation of 1-Methyl-2-(p-Dimethylaminostyryl)-Quinolinium Iodide

Using the methods outlined in J. Am. Chem. Soc. 77, 1687 (1955), and those described in Helv. Chim. Acta. 18, 1395–1413 (1935), the above compound is prepared as follows. One-half mole quantity each of 1-methylquinaldinium iodide and p-dimethylaminobenzaldehyde are refluxed in 500 ml. of alcohol for 12 hours using 1 ml. of piperidine as a catalyst. The reaction mixture is then allowed to cool and the product filtered, yielding 150 g. of the crystalline material.

EXAMPLE 3

Preparation of 1-Methyl-2-(p-Dimethylaminostyryl)-Quinolinium Methyl Sulfate 1-methylquinaldinium methyl sulfate (80.8 g.) and p-dimethylaminobenzaldehyde (44.7 g.) are refluxed in 500 ml. of ethanol for 24 hours. The mixture is chilled and the first crop of crystals filtered off. A second crop is obtained by reducing the volume of the mother liquor. The two crops are combined (total 90 g.) and recrystallized twice from ethanol yielding a product which analyses as the desired product.

EXAMPLE 4

*Preparation of 1-Methyl-2-(p-Diethylaminostyryl)-Quinolinium Chloride* p-Diethylaminobenzaldehyde (17.7 g.), 1-methyl quinaldinium chloride (19.4 g.) and 1 ml. of piperidine are added to 100 ml. of ethanol and the mixture refluxed for 24 hours. The solution is then added to 1000 ml. of dioxane and the solution is boiled for 10 minutes, then chilled. Sufficient ether is added to the chilled solution to cause precipitation and the crystals which precipitate are filtered off. Additional crops are obtained by reducing the volume of the mother liquor bringing the total yield to 15 g. Elemental analysis established the identity of the product.

The following examples illustrate the novel antilarval effect of the treatment and compositions of this invention as well as their adulticidal effect against various helminths.

EXAMPLE 5

The following Table I shows the high degree of larvacidal effectiveness of 1-methyl-2-(p-dimethylaminostyryl)-quinolinium chloride against destructive migrating larvae of *Ascaris suum* in pigs. Data were obtained with pigs that had been experimentally infected with about 50,000 infective eggs. Treatment, in experimental groups, was given continuously in the total daily ration starting one day before inoculation. Concentrations of 0.03 and 0.015% of the drug were highly effective in preventing damage to liver and lungs and eliminating the larvae in the small intestine. The untreated pigs showed severe pathologic condition of liver and lungs and a large number of larvae, at necropsy. The control animals also developed verminous pneumonia, commonly called thumps, as a result of the migrating larvae. This high degree of ascarid larvacidal activity has never been reported before with any current anthelmintic and this novel effect will greatly protect young pigs from the most harmful stage of swine ascarid infections.

TABLE I.—THE ANTHELMINTIC EFFECTS OF 1-METHYL-2-(P-DIMETHYLAMINOSTYRYL) QUINOLINIUM CHLORIDE AGAINST LARVAL STAGES OF *ASCARIS SUUM* IN PIGS

| Daily dose in swine feed | | | | Effectiveness | | | | | |
| --- | --- | --- | --- | --- | --- | --- | --- | --- | --- |
| | | | | Liver damage | | Lung damage | | Control of larvae in intestine | |
| Mg./kg. of body weight | Average percent of diet | No. of days [a] | No. of pigs | Av. No. of spots on liver | Percent reduction | Amount | Percent reduction | Av. No. | Percent reduction |
| 25 | .03 | 3 | 6 | 14 | 96 | 0 | 100 | 0 | 100 |
| 12.5 | .015 | 9 | 3 | 0 | 100 | 0 | 100 | 0 | 100 |
| [b] 0 | ------ | ------ | 5 | 342 | ------ | ([c]) | ------ | 1,540 | ------ |

[a] Treatment started one day before inoculation of pigs with approximately 50,000 infective eggs of *A. suum*.
[b] Untreated control.
[c] Severe.

EXAMPLE 6

Experimental evidence demonstrated that the reduction in the amount of liver pathology caused by migrating Ascaris larvae in pigs is an effective means of evaluating and comparing the activity of the compositions of this invention. Table II shows the results of various experiments conducted with pigs infected with about 50,000 infective eggs. Medicated feed was started one day prior to inoculation and repeated for three days. The data of Table II show that the compositions vary in effectiveness and the concentrations most effective ranged from .004 to .06% of daily diet.

TABLE II.—THE EFFECTS OF STYRYLQUINOLINIUM COMPOUNDS IN REDUCING LIVER DAMAGE CAUSED BY MIGRATING LARVAE OF *ASCARIS SUUM* IN SWINE $$\begin{array}{c} R' \\ \diagdown \\ N^+ \\ | \\ R'' \quad X^- \end{array} - CH=CH - \bigcirc - R$$

| Compound | Substituents | | | | Position of styryl group | Daily dose (mg./kg., body weight) in feed for three days | Approx. percent daily diet | Percent reduction of liver damage* |
| --- | --- | --- | --- | --- | --- | --- | --- | --- |
| | R | R' | R'' | X | | | | |
| A | N(CH₃)₂ | H | CH₃ | Cl | 2 | 25    [a]12.5 | 0.03   0.015 | 96   99+ |
| B | N(CH₃)₂ | H | CH₃ | I | 2 | 25 | .03 | 94 |
| C | N(CH₃)₂ | H | CH₃ | CH₃SO₄ | 2 | [b]5 | .004 | 98 |
| D | N(CH₃)₂ | H | CH₃ | I | 4 | 25 | .03 | 77 |
| E | N(CH₃)₂ | H | C₂H₅ | I | 2 | 12.5   6.25 | .015   .007 | 95   74 |
| F | N(CH₃)₂ | CH₃ | CH₃ | I | 2 | 12.5   5 | .015   .004 | 100   73 |
| G | N(C₂H₅)₂ | H | CH₃ | Cl | 2 | 12.5 | .015 | 99 |
| H | N(C₂H₅)₂ | H | C₂H₅ | C₂H₅SO₄ | 2 | 12.5 | .015 | 98 |
| J | N(C₃H₅)₂ | H | CH₃ | I | 2 | 25   12.5 | .03   .015 | 89   78 |
| K | Cl | H | CH₃ | Cl | 2 | [a]50 | .06 | 75 |

*Compared with untreated controls. Figures to right are for daily doses and percent diet shown at right of preceding columns.
[a] 9 days of medicated feed.
[b] 15 days of medicated feed.

EXAMPLE 7

Tests with dogs experimentally infected with 100–200 hookworms and treated on various days after inoculation show that the compositions of this invention are highly effective against the larval and adult stages of the canine hookworms as well as swine ascarids. Table III shows the effectiveness of 1-methyl-2-(p-dimethylaminostyryl)-quinolinium chloride when given repeatedly in low concentrations in feed or in a single dose by capsule. The anti-larval effect was determined by comparing the number of worms in the treated dogs with those in 16 untreated dogs which averaged 155 hookworms per dog. The effectiveness against adult hookworms was determined by comparing the pretreatment egg per gram counts of a dog with the number of worms found at necropsy.

EXAMPLE 8

Experimental data involving other experimentally hookworm infected dogs show that a number of different compositions of the invention possess antihookworm activity both as single therapeutic treatments and repeated prophylactic treatment against adults and larvae. Their relative activities are compared in Table IV.

TABLE IV.—THE EFFECTS OF STYRYLQUINOLINIUM COMPOSITIONS OF THIS INVENTION AGAINST LARVAL AND ADULT STAGES OF THE HOOKWORM, *ANCYLOSTOMA CANINUM*, IN DOGS

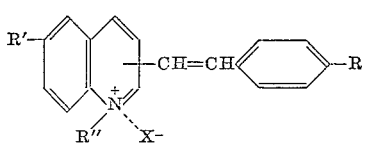

| Compound | Substituents | | | | Position of styryl group | Effectiveness relative to 1-methyl-2-(p-dimethylaminostyryl)-quinolinium chloride [Table III] [a] | |
|---|---|---|---|---|---|---|---|
| | R | R' | R'' | X | | Single oral dose in capsule against adult worms | Repeated doses in feed against adults and larvae |
| A | $N(CH_3)_2$ | H | $CH_3$ | Cl | 2 | 1.0 | 1.0 |
| B | $N(CH_3)_2$ | H | $CH_3$ | I | 2 | 0.75 | 0.75 |
| C | $N(CH_3)_2$ | H | $CH_3$ | $CH_3SO_4$ | 2 | 0.75 | 0.75 |
| E | $N(CH_3)_2$ | H | $C_2H_5$ | I | 2 | 0.5 | |
| F | $N(CH_3)_2$ | $CH_3$ | $CH_3$ | I | 2 | 1.0 | >0.5 <1 |
| K | Cl | H | $CH_3$ | Cl | 2 | 0.5 | 0.2 |
| L | Br | H | $CH_3$ | Cl | 2 | 0.1 | |
| M | H | H | $CH_3$ | I | 2 | 0.1 | 0.1 |

[a] Compared to minimal highly effective doses given in Table III.

EXAMPLE 9

In tests which involved dogs naturally infected with canine ascarids, the effectiveness of the compounds of this invention against mature ascarids was demonstrated.

TABLE III.—THE ANTHELMINTIC EFFECTS OF 1-METHYL-2-(P-DIMETHYLAMINOSTYRYL)-QUINOLINIUM CHLORIDE AGAINST THE HOOKWORM, *ANCYLOSTOMA CANINUM*, IN DOGS

| Daily dose, mg./kg. (body wt.) | Approx. percent total diet | Method of administration | | Parasitic larval stages | | |
|---|---|---|---|---|---|---|
| | | Number of daily doses | Carrier [a] | Number of dogs | Age of Hookworm infection treated (days old) | Average percent worms removed |
| 15 | .01 | 1 | Capsule | 2 | 7 | 98 |
| 5 | .01 | 3 | | 2 | 6-8 | 90 |
| 5 | .01 | 5 | | 2 | 1-5 | 99 |
| 5 | .01 | 5 | | 2 | 6-10 | 99 |
| 1 | .002 | 10 | | 6 | 1-10 | 82 |
| 2 | .005 | 10 | | 9 | 1-10 | 90 |
| 4 | .01 | 10 | | 6 | 1-10 | 99 |
| 6 | .01 | 10 | Dry dog meal | 2 | 1-10 | 99 |
| | | | | Adult stages | | |
| 5 | .005 | 1 | Casule | 6 | >28 | 97 |
| 2-2.5 | | 7 | | 5 | >28 | 99 |
| 4 | .01 | 7 | | 2 | >28 | 100 |

[a] Commercial canned dog feed, unless otherwise indicated.
> = More than.

Table V presents this data showing the anti-ascarid activity of repeated low level and high level single doses of three analogs.

TABLE V.—THE EFFECTS OF STYRYLQUINOLINIUM COMPOSITIONS OF THIS INVENTION AGAINST THE ASCARIDS, *TOXOCARA CANIS* AND *TOXASCARIS LEONINA*, IN DOGS

| Compound (Identified in Table II) | No. dogs | Dose mg./kg. body weight | Percent total diet | No. doses | Method of administration | Total No. ascarids Eliminated | Total No. ascarids Retained | Percent effectiveness |
|---|---|---|---|---|---|---|---|---|
| A | 2 | 20 | .04 | 30 | Repeated doses a | All b | 0 | 100 |
|  | 2 | 15 | .03 | 30 | ----do---- | All c | 0 | 100 |
|  | 2 | 10 | .02 | 30 | ----do---- | ---do--- | 0 | 100 |
|  | 2 | 0 | 0 | 0 | Untreated controls | 0 | 5 |  |
| B | 1 | 50 |  |  | One dose, capsule | 5 | 3 | 63 |
|  | 2 | 5 | .01 | 5 | Repeated doses a | 13 | 4 | 77 |
| E | 2 | 50 |  |  | One dose, capsule | 20 | 4 | 83 | a Once daily in feed.
b Ascarids found in feces within first 3 days of 30 day treatment.
c Ascarids found in feces within first 13 days of 30 day treatment.

EXAMPLE 10

The compositions of this invention were found to be highly effective against experimentally established infections of *Trichostrongylus colubriformis* in sheep. Since the usual method of treating sheep has been orally, by an aqueous drench suspension, the active compositions of this invention were so formulated and administered following a pretreatment drench of 1 cc. of 10% copper sulfate solution. The effect of each treatment was determined by a critical test in which the number of worms eliminated in the feces of sheep is compared with the number retained in the animal at necropsy. Table VI shows the high degree of effectiveness of the compositions against this gastrointestinal nematode of sheep.

TABLE VI.—EFFECTS OF STYRYLQUINOLINIUM COMPOSITIONS OF THIS INVENTION AGAINST *TRICHOSTRONGYLUS COLUBRIFORMIS* IN SHEEP

| Compound (Identified in Table II) | Oral dose, mg./kg. body weight | No. worms Eliminated | No. worms Retained | Percent effectiveness |
|---|---|---|---|---|
| A | 25 | 3,760 | 610 | 86 |
| B | 100 | 2,550 | 0 | 100 |
|  | 50 | 8,420 | 280 | 97 |
|  | 50 | 4,975 | 970 | 84 |
|  | 50 | 6,150 | 500 | 90 |
| J | 60 | 2,500 | 0 | 103 |

We claim:

1. An oral method of treatment useful in the prevention of economic losses due to larval helminths which invade domesticated warm blooded animals by the oral route comprising orally administering to said animals so invaded and infected a composition of 10 mg. to 40 g. of a styrylquinolinium compound having the formula:

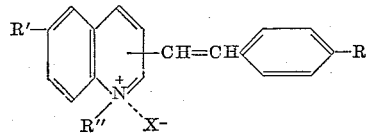

in which R is selected from the group consisting of hydrogen, halogen and lower dialkylamino groups, R' is selected from the group consisting of hydrogen and methyl, R" is lower alkyl, X⁻ is a physiologically acceptable anion and the styryl substituent being attached to the quinolinium ring at a position selected from the group consisting of 2 and 4, and an edible carrier.

2. An oral method of treatment in accordance with claim 1 in which the edible carrier is feed stuff and the concentration of active ingredient in the total daily ration does not exceed 0.2%.

3. A method in accordance with claim 1 in which the styrylquinolinium compound is 1-methyl-2-(p-dimethylaminostyryl)-quinolinium iodide.

4. An oral method of treatment in accordance with claim 1 in which the styrylquinolinium compound is 1-methyl-2-(p-diethylaminostyryl)-quinolinium chloride.

5. An oral method of treatment in accordance with claim 1 in which the styrylquinolinium compound is 1-methyl-2-(p-dimethylaminostyryl) - quinolinium methyl sulfate.

6. An oral method of treatment in accordance with claim 1 in which the styrylquinolinium compound is 1-ethyl-2-(p-dimethylaminostyryl)-quinolinium iodide.

7. An oral method of administration in accordance with claim 1 in which the styrylquinolinium compound is 1-ethyl-2-(p-diethylaminostyryl) - quinolinium ethyl sulfate.

8. An oral method of treatment useful in the prevention of economic losses due to larval helminths which invade domesticated warm blooded animals by the oral route which comprises orally administering to said animals so invaded and infected a composition of 10 mg. to 40 g. of 1-methyl-2-(p-dimethylaminostyryl)-quinolinium chloride and an edible carrier.

References Cited in the file of this patent

Peters: The J. of Pharmacology and Exptl. Therapeutics, February 1949, pp. 212 and 236–238.
Foley: Annals of the New York Acad. of Sci., vol. 76, 1958, pp. 413, 417–419, 440 and 441.
Chem. Abst. (Subj. Index), vol. 53, 1959, pp. 2399S and 2400S.